United States Patent
Whelan et al.

(10) Patent No.: US 9,625,573 B2
(45) Date of Patent: Apr. 18, 2017

(54) GEOLOCATION LEVERAGING SPOT BEAM OVERLAP

(75) Inventors: David A. Whelan, Newport Coast, CA (US); Gregory M. Gutt, Ashburn, VA (US); Robert W. Brumley, Narberth, PA (US); Michael L. Eglington, San Bruno, CA (US); Christopher J. Martens, Creve Coeur, MO (US); Anne T. Haddad, Berwyn, PA (US); Rachel Rané Schmalzried, Garden Grove, CA (US)

(73) Assignee: THE BOEING COMPANY, Chicago, IL (US)

( * ) Notice: Subject to any disclaimer, the term of this patent is extended or adjusted under 35 U.S.C. 154(b) by 682 days.

(21) Appl. No.: 12/756,961

(22) Filed: Apr. 8, 2010

(65) Prior Publication Data
US 2011/0248887 A1 Oct. 13, 2011

(51) Int. Cl.
*G01S 5/02* (2010.01)
*G01S 11/06* (2006.01)
(Continued)

(52) U.S. Cl.
CPC ............... *G01S 11/06* (2013.01); *G01S 5/02* (2013.01); *G01S 19/38* (2013.01); *G01S 19/26* (2013.01)

(58) Field of Classification Search
CPC .................................. G01S 19/38; G01S 11/06
(Continued)

(56) References Cited

U.S. PATENT DOCUMENTS 5,444,450 A * 8/1995 Olds et al. ............... 342/357.21
5,500,648 A * 3/1996 Maine et al. ............. 342/357.78
(Continued)

FOREIGN PATENT DOCUMENTS

EP 0868036 A2 9/1998
JP H4-7615 B 1/1992
(Continued)

OTHER PUBLICATIONS

PCT International Search Report for PCT/US2011/031851, Applicant: The Boeing Company, Form PCT/ISA/210 and 220, dated Oct. 7, 2011 (7pages).
(Continued)

*Primary Examiner* — Gregory C Issing
(74) *Attorney, Agent, or Firm* — Vista IP Law Group LLP; Cynthia A. Dixon

(57) ABSTRACT

A method and system are disclosed for providing an estimate of a location of a user receiver device. The method and system involve emitting from at least one vehicle at least one spot beam on Earth, and receiving with the user receiver device a signal from at least one spot beam. In one or more embodiments, at least one vehicle may be a satellite and/or a pseudolite. The method and system further involve calculating with the user receiver device the estimate of the location of the user receiver device according to the user receiver device's location within at least one spot beam. In some embodiments, when the user receiver device receives signals from at least two spot beams, the user receiver device calculates the estimate of the location of the user receiver device to be located in the center of the intersection of at least two spot beams.

46 Claims, 11 Drawing Sheets

(51) Int. Cl.
*G01S 19/38* (2010.01)
*G01S 19/26* (2010.01)

(58) Field of Classification Search
USPC ... 342/357.2, 357.21, 357.78, 458, 464, 463
See application file for complete search history.

(56) References Cited

U.S. PATENT DOCUMENTS

| | | | |
|---|---|---|---|
| 5,543,813 A * | 8/1996 | Araki et al. | 342/357.2 |
| 5,552,795 A * | 9/1996 | Tayloe et al. | 342/357.21 |
| 5,592,175 A * | 1/1997 | Tayloe | 342/357.78 |
| 5,610,615 A * | 3/1997 | Chiodini | 342/357.78 |
| 5,666,647 A * | 9/1997 | Maine | 455/12.1 |
| 5,886,666 A * | 3/1999 | Schellenberg et al. | 701/3 |
| 5,907,809 A * | 5/1999 | Molnar et al. | 455/456.2 |
| 6,166,687 A * | 12/2000 | Ishikawa et al. | 342/357.2 |
| 6,408,178 B1 * | 6/2002 | Wickstrom et al. | 455/427 |
| 6,515,617 B1 * | 2/2003 | Demers et al. | 342/357.64 |
| 6,677,894 B2 * | 1/2004 | Sheynblat et al. | 342/357.46 |
| 6,684,071 B1 * | 1/2004 | Molnar et al. | 455/429 |
| 6,871,061 B1 * | 3/2005 | Koorapaty et al. | 455/404.2 |
| 7,042,392 B2 | 5/2006 | Whelan et al. | |
| 7,372,400 B2 | 5/2008 | Cohen et al. | |
| 7,468,696 B2 | 12/2008 | Bornholdt | |
| 7,489,926 B2 | 2/2009 | Whelan et al. | |
| 7,554,481 B2 | 6/2009 | Cohen et al. | |
| 7,579,986 B2 | 8/2009 | DiEsposti | |
| 7,579,987 B2 | 8/2009 | Cohen et al. | |
| 7,583,225 B2 | 9/2009 | Cohen et al. | |
| 7,619,559 B2 | 11/2009 | DiEsposti | |
| 7,688,261 B2 | 3/2010 | DiEsposti | |
| 2002/0149518 A1 * | 10/2002 | Haataja et al. | 342/458 |
| 2005/0159891 A1 | 7/2005 | Cohen et al. | |
| 2006/0071854 A1 * | 4/2006 | Wilcox | 342/458 |
| 2006/0238419 A1 * | 10/2006 | Bucknor et al. | 342/357.09 |
| 2008/0059059 A1 | 3/2008 | Cohen et al. | |
| 2008/0146246 A1 | 6/2008 | Bornholdt et al. | |
| 2008/0291086 A1 * | 11/2008 | Walley et al. | 342/367 |
| 2009/0174597 A1 | 7/2009 | DiLellio et al. | |
| 2009/0228210 A1 | 9/2009 | Gutt | |
| 2009/0315764 A1 | 12/2009 | Cohen et al. | |

FOREIGN PATENT DOCUMENTS

| | | |
|---|---|---|
| JP | H7-59149 A | 3/1995 |
| JP | H8-510609 A | 11/1996 |
| JP | H10-276467 A | 10/1998 |
| JP | 2000-504185 A | 4/2000 |
| JP | 2001-500970 A | 1/2001 |
| JP | 2009-229065 A | 10/2009 |

OTHER PUBLICATIONS

PCT Written Opinion of the International Search Authority for PCT/US2011/031851, Applicant: The Boeing Company, Form PCT/ISA/237, dated Oct. 7, 2011 (9pages).

Office Action from Japanese Patent Office for corresponding Japanese Patent Application No. 2013-504009, prepared on May 30, 2016.

Office Action from Japanese Patent Office for corresponding Japanese Patent Application No. 2013-504009, prepared on Jul. 6, 2015.

* cited by examiner

FIG. 9A
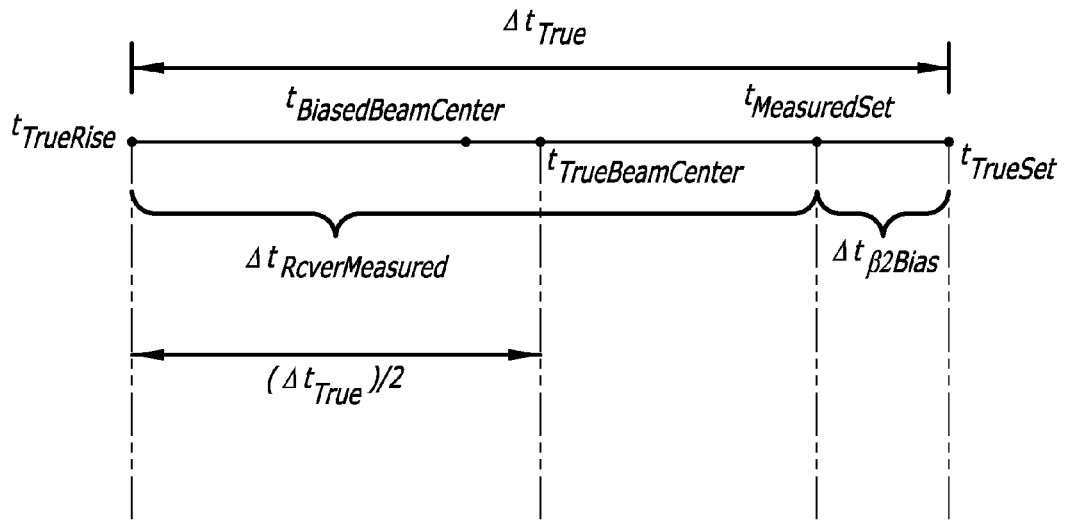
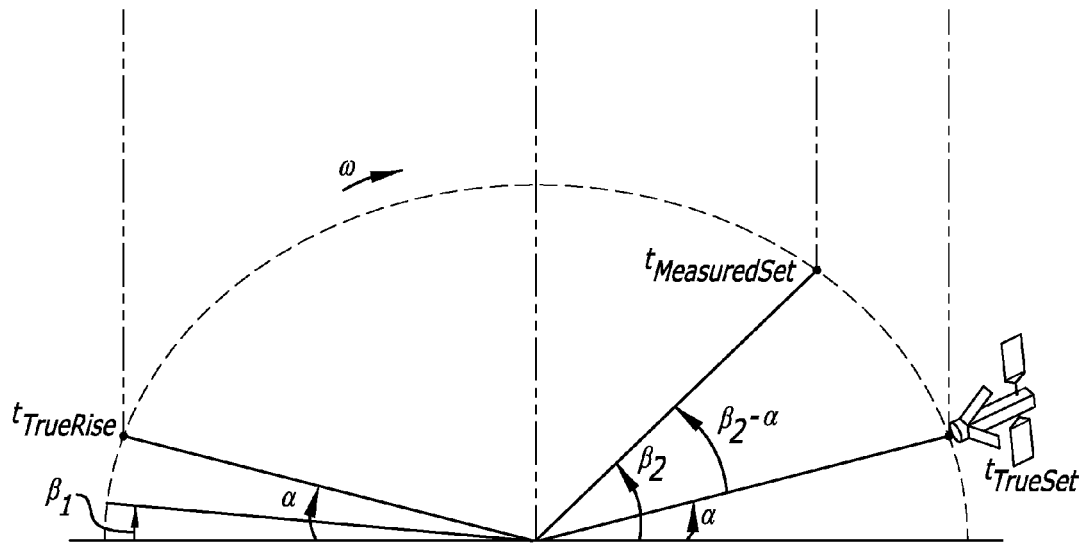
FIG. 9B

GEOLOCATION LEVERAGING SPOT BEAM OVERLAP

BACKGROUND

The present disclosure relates to using spot beam overlap for geolocation leveraging. In particular, it relates to using spot beams to obtain precise positioning that maintains high enough accuracy to be used for time transfer.

SUMMARY

The present disclosure relates to a system, apparatus, and method for using spot beam overlap for geolocation leveraging. In one or more embodiments, the method for using spot beam overlap for geolocation leveraging involves providing an estimate of a location of a user receiver device. The method comprises emitting from at least one vehicle at least one spot beam on Earth, and receiving with the user receiver device a signal from at least one spot beam. The method further comprises calculating with the user receiver device an estimate of the location of the user receiver device according to the user receiver device's location within at least one spot beam.

In one or more embodiments, the method further comprises calculating a range from at least one vehicle to the surface of the Earth. In some embodiments, the method further comprises calculating a range from at least one vehicle to the user receiver device. In at least one embodiment, calculating the range from at least one vehicle to the user receiver device involves measuring a Doppler frequency offset of at least one vehicle, calculating a Doppler range estimate and/or pseudorange measurements using a Kalman filter, and calculating a running estimate of the range from at least one vehicle to the user receiver device.

In some embodiments of the present disclosure, the method for using spot beam overlap for geolocation leveraging provides an improvement in accuracy of geolocation algorithms. In one or more embodiments, the user receiver device is located in an attenuated environment, a jammed environment, and/or an occluded environment. In at least one embodiment, the occluded environment is indoors. In some embodiments, the method for using spot beam overlap for geolocation leveraging further involves using signal to noise ratio (SNR) measurements from at least one vehicle in order to further refine the estimate of the location of the user receiver device.

In one or more embodiments, at least one vehicle of the present disclosure is a satellite, a pseudolite, a space shuttle, an aircraft, a balloon, and/or a helicopter. In alternative embodiments, various other types of vehicles may be employed for at least one vehicle of the present disclosure. In some embodiments, the types of aircrafts that may be used include, but are not limited to, airplanes and/or unmanned aerial vehicles (UAVs). In at least one embodiment, the types of satellites that may be employed for the present disclosure include, but are not limited to, low earth orbit (LEO) satellites, medium earth orbit (MEO) satellites, and/or geostationary earth orbit (GEO) satellites. In some embodiments, at least one vehicle has a known orbit and/or a known path. In one or more embodiments, the user receiver device is mobile and/or stationary.

In some embodiments, the method involves at least one vehicle emitting at least one spot beam with at least one radio frequency (RF) antenna. In at least one embodiment, at least one spot beam is radiated from at least one RF antenna as a fixed position beam. In other embodiments, at least one spot beam is radiated from at least one RF antenna as a scanning beam. In some embodiments, the user receiver device receives the signal from at least one spot beam with at least one RF antenna.

In one or more embodiments, the user receiver device uses a processor to calculate the estimate of the location of the user receiver device. In some embodiments, when the user receiver device receives a signal from only one spot beam, the user receiver device calculates the estimate of the location of the user receiver device to be located in the center of the intersection of the one spot beam. In at least one embodiment, when the user receiver device receives signals from at least two spot beams, the user receiver device calculates the estimate of the location of the user receiver device to be located in the center of the intersection of at least two spot beams. In other embodiments, when the user receiver device receives signals from at least two spot beams, the user receiver device calculates the estimate of the location of the user receiver device to be located at a centroid of the centers of at least two spot beams.

In some embodiments, the user receiver device of the present disclosure records a spot beam position as being from the time the spot beam rises ($t_{RISE}$) to the time the spot beam sets ($t_{SET}$). In one or more embodiments, when the mask angles are uniform in all directions with respect to the user receiver device, it is assumed that at time=$((t_{SET}-t_{RISE})/2)$, the user receiver device is located at the center of the spot beam in the in-track direction. Alternatively, when the mask angles are non-uniform in a spot beam rise direction and a spot beam set direction, it is assumed that at time=$((\Delta t_{True})/2)$, where $(\Delta t_{True})/2=(\Delta t_{RcverMeasured}+\Delta t_{\beta Bias})/2$, the user receiver device is located at the center of the spot beam in the in-track direction.

In one or more embodiments, the user receiver device uses the received amplitude of at least one spot beam to calculate the estimate of the location of the user receiver device. In one or more embodiments, the user receiver device averages two or more estimates of the location of the user receiver device that were calculated over time in order to further refine the estimate of the location of the user receiver device.

In some embodiments, the user receiver device uses a Kalman filter in order to average two or more estimates of the location of the user receiver device. In alternative embodiments, the user receiver device uses a matched filter in order to average two or more estimates of the location of the user receiver device. In one or more embodiments, the estimate of the location of the user receiver is used by a global positioning system (GPS) in order to assist in rapidly acquiring the GPS signal.

In one or more embodiments, the system for using spot beam overlap for geolocation leveraging involves providing an estimate of a location of a user receiver device. The system comprises at least one vehicle and a user receiver device. In some embodiments, at least one vehicle emits at least one spot beam on Earth. In at least one embodiment, the user receiver device includes at least one RF antenna and a processor. In one or more embodiments, at least one RF antenna receives at least one spot beam. In some embodiments, the processor calculates the estimate of the location of the user receiver device according to the user receiver device's location within at least one spot beam.

In some embodiments, the user receiver device further includes a local clock and memory. The memory is adapted to store successive spot beam identifying information that is recorded over time. Also, the processor of the user receiver device is able to calculate the Doppler frequency offset of at least one vehicle.

In at least one embodiment, the user receiver device further includes an internal orbital model. In some embodiments, the user receiver device receives orbital data information via transmissions from at least one vehicle. In other embodiments, the user receiver device receives orbital delta correction information via transmissions from at least one vehicle and/or from an earth-based network. In at least one embodiment of the present disclosure, the earth-based network is a cellular network.

DRAWINGS

These and other features, aspects, and advantages of the present disclosure will become better understood with regard to the following description, appended claims, and accompanying drawings where:

FIG. 9A shows an illustration of using a single spot beam's rising and setting times to estimate the location of a user receiver device for a non-uniform masking angle, in accordance with at least one embodiment of the present disclosure.

FIG. 9B shows a pictorial representation of using a single satellite's spot beam's rising and setting times to estimate the location of a user receiver device for a non-uniform masking angle, in accordance with at least one embodiment of the present disclosure.

Figure 10:
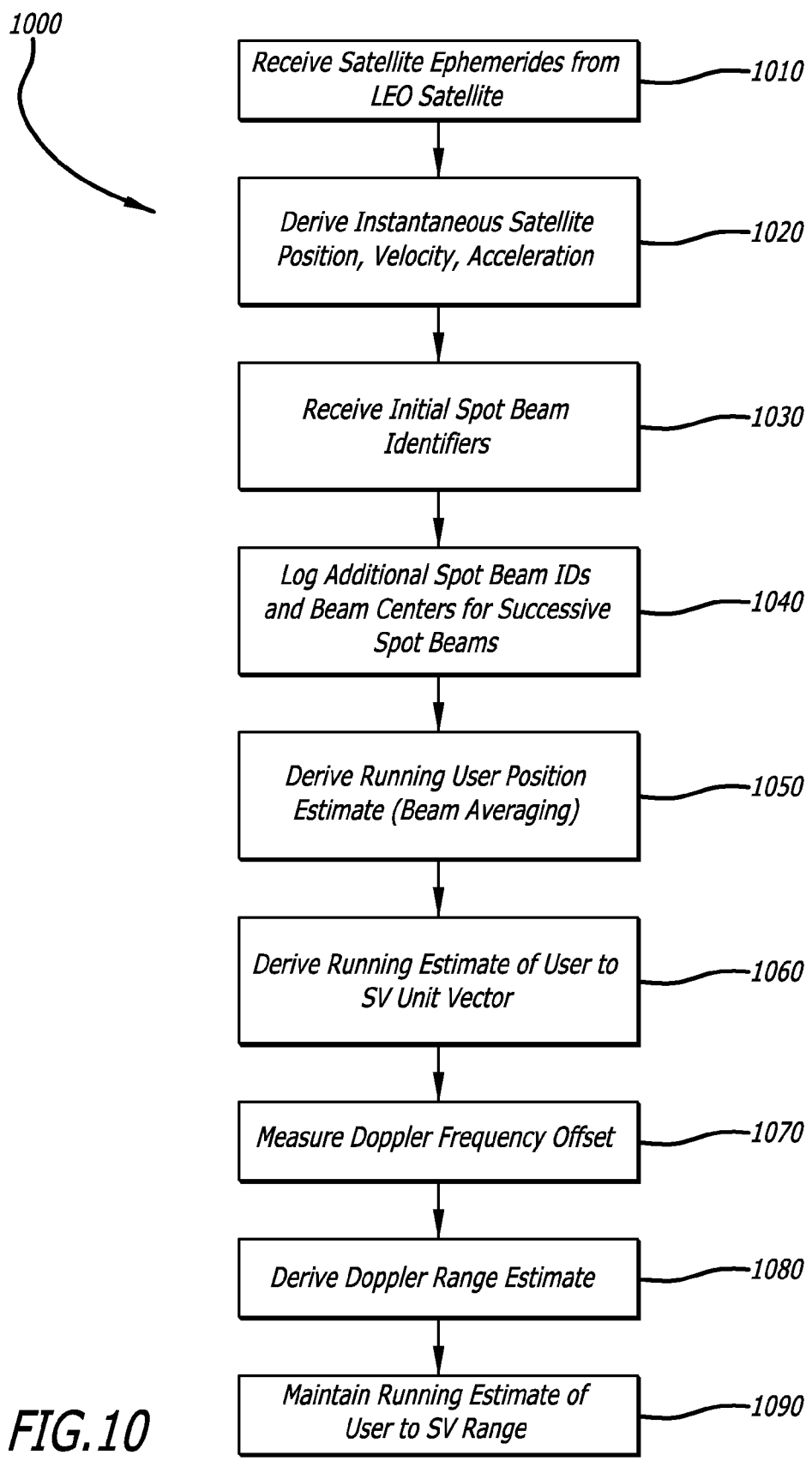

FIG. 10 provides a flow diagram illustrating a method of obtaining a running estimate of the range between a user receiver device and a satellite, in accordance with at least one embodiment of the present disclosure.

DESCRIPTION

The methods and apparatus disclosed herein provide an operative system for using spot beam overlap for geolocation leveraging. Specifically, this system relates to using spot beams in order to obtain precise positioning that maintains a high enough accuracy to be used for time transfer.

Currently, navigation and timing signals provided by various existing satellite navigation systems often do not provide satisfactory system performance. In particular, the signal power, bandwidth, and geometrical leverage of such navigation and timing signals are generally insufficient to meet the needs of many demanding usage scenarios. For example, existing navigation and timing approaches based on global positioning system (GPS) signals may not typically be available to a navigation user in many instances. During operation, a GPS receiver must typically receive at least four simultaneous ranging sources in order to permit three-dimensional (3D) positioning and accurate time transfer. However, GPS signals often provide insufficient, low-signal power or geometry readily to penetrate urban canyons or walls of buildings. When this occurs, a GPS receiver will not be able to receive the signals it requires for accurate 3D positioning and time transfer. In another example, navigational approaches based on cellular telephone or television signals also do not provide satisfactory system performance. This is because their signals typically lack vertical navigation information, which is desired for many navigational usage scenarios.

Existing navigation systems have attempted to address indoor navigation deficiencies by the use of various approaches. Some of these various approaches include the use of inertial navigation systems, specialized beacons, and highly sensitive GPS systems. However, it should be noted that each of these approaches has their own unique drawbacks. Inertial navigation systems drift and are expensive. Beacons require specialized fixed assets that are expensive and are not standardized. As such, beacons are built only to have a specialized utility. And, sensitive GPS systems often do not perform to user expectations due to the weakness of the GPS signals in indoor environments. The disclosed systems and methods are able to provide an improvement in navigation system performance when the user receiver device is located in an attenuated environment, a jammed environment, and/or an occluded environment, such as indoors.

The systems and methods of the present disclosure allow for determining an estimate of the location of a user receiver device on or near the surface of the Earth based on the knowledge of a satellite's directional signals (i.e. spot beams) in which the user receiver device is located within. By utilizing the knowledge of the uniquely-identifiable spot beam geometry, such as that from an Iridium low earth orbiting (LEO) satellite, the user receiver device is able to discern which set of satellite spot beams the user receiver device is located within at any given period of time. The simplest approximation of the user receiver device's location is the calculation of the projection of the center of the spot beam on the surface of the Earth, which statistically holds the highest likelihood of being the user receiver device's true location. This first order approximated user receiver device location estimate combined with the known satellite position, as derived by the user receiver device, can be used to estimate the user receiver device-to-satellite unit vector.

The system of the present disclosure employs a method referred to as beam averaging, which includes various embodiments in order to estimate the user receiver device's location, and subsequently refine the estimate with additional measurements. After a first order location estimate is developed from a signal spot beam, the estimate can be refined by monitoring successive spot beams sweeping over the user receiver device as time progresses. When there is a situation of a user receiver device being located within the intersection of two or more spot beams, the user receiver device's location can be estimated to be at the center of the intersection of the spot beams.

During a given duration of time, the user receiver device will be likely be located within multiple overlapping spot beams from a single satellite or multiple satellites. The location of the user receiver device can be estimated to be at the centroid of the centers of the multiple overlapping spot beams. Additionally, two or more successive user receiver device location estimates can be averaged over time in order to reduce further the user receiver device's location error. Satellites transmitting a greater number of spot beams per unit area will provide a more accurate user receiver device estimate. By carefully recording which beams are overlapping and how the overlap changes with respect to time, the accuracy of geolocation algorithms and satellite-ranging predictions can be significantly improved. In at least one embodiment, a single spot beam's rising and setting times are tracked, and the location of the user receiver device is estimated to be at a position within the spot beam that corresponds to being halfway between the spot beam rise and set times as determined by the user receiver device.

In one or more embodiments, the disclosed systems and methods obtain an estimate of the position of a user receiver device that is located on or near the surface of the Earth by using knowledge of at least one non-geostationary vehicle's directional signals (i.e. spot beams) in which the receiver is located within. A particular type of non-geostationary vehicles that may be employed by the present disclosure is exemplified by the Iridium satellite constellation, which are low-earth orbiting (LEO), 3-axis stabilized, earth-pointing satellites that transmit signals towards the Earth in a known deterministic antenna spot-beam pattern. For any given satellite, if at any time $t_1$, the position and attitude of the satellite relative to the Earth are known, and if the directions of the transmitted antenna spot beams relative to the satellite are known, then the intersection of the center of the spot beams on the surface of the Earth at time $t_1$ can be calculated. Further, if the properties of the antenna spot beams are well known, then the pattern of the projections of the antenna spot beams on the Earth's surface at time $t_1$ can be calculated. This is well known to persons who are versed in the art. As in the Iridium satellite constellation example, it is possible for the satellite to transmit the spot-beam center location to the user receiver device in a defined coordinate system.

By utilizing knowledge of the uniquely-identifiable spot beam geometry, the user receiver device, which detects at least one spot beam signal, is able to discern which set of satellites and spot beams that the user receiver device is located within at a given time $t_1$. For example, part of the received signal may identify the specific spot-beam identification number. Once the spot beam in which the user receiver device is located within is determined, the user receiver device can make the determination that it is at a location within the projection of the spot beam. Then, once the user receiver device calculates the location of the projection of the spot beam at time $t_1$, the user receiver device can calculate an estimate of its own location at time $t_1$. The accuracy of this measurement will depend on the size of the projection of the given spot beam on the surface of the Earth. Vehicles transmitting a greater number of spot beams per vehicle will provide a more accurate position estimate. As will be easily understood, the accuracy of such a system will be a function of the size and number of the spot beam projections on or near the surface of the Earth. As such, the accuracy of the system may be improved by increasing the number of spot beams and decreasing the radius of the spot beams (i.e. focusing the spot beams) on the surface of the Earth.

It should be noted that the systems and methods of the present disclosure may employ any various type of overhead vehicles as a transmission source for the spot beams. Types of vehicles that may be employed for the system of the present disclosure include, but are not limited to, a satellite, a pseudolite, a space shuttle, an aircraft, an airplane, an unmanned aerial vehicle (UAV), a balloon, and/or a helicopter. In addition, various types of satellites may be used for the vehicles of the disclosed system include, but not limited to, low earth orbiting (LEO) satellites, medium earth orbit (MEO) satellites, and/or geostationary earth orbit (GEO) satellites. When employing vehicles that are not satellites, virtually no changes are required to the disclosed system so long as the spot beam geometry is known by the user receiver device and is well defined. Also, in one or more embodiments for the system of the present disclosure, at least one vehicle has a known orbit and/or a known path.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1A:
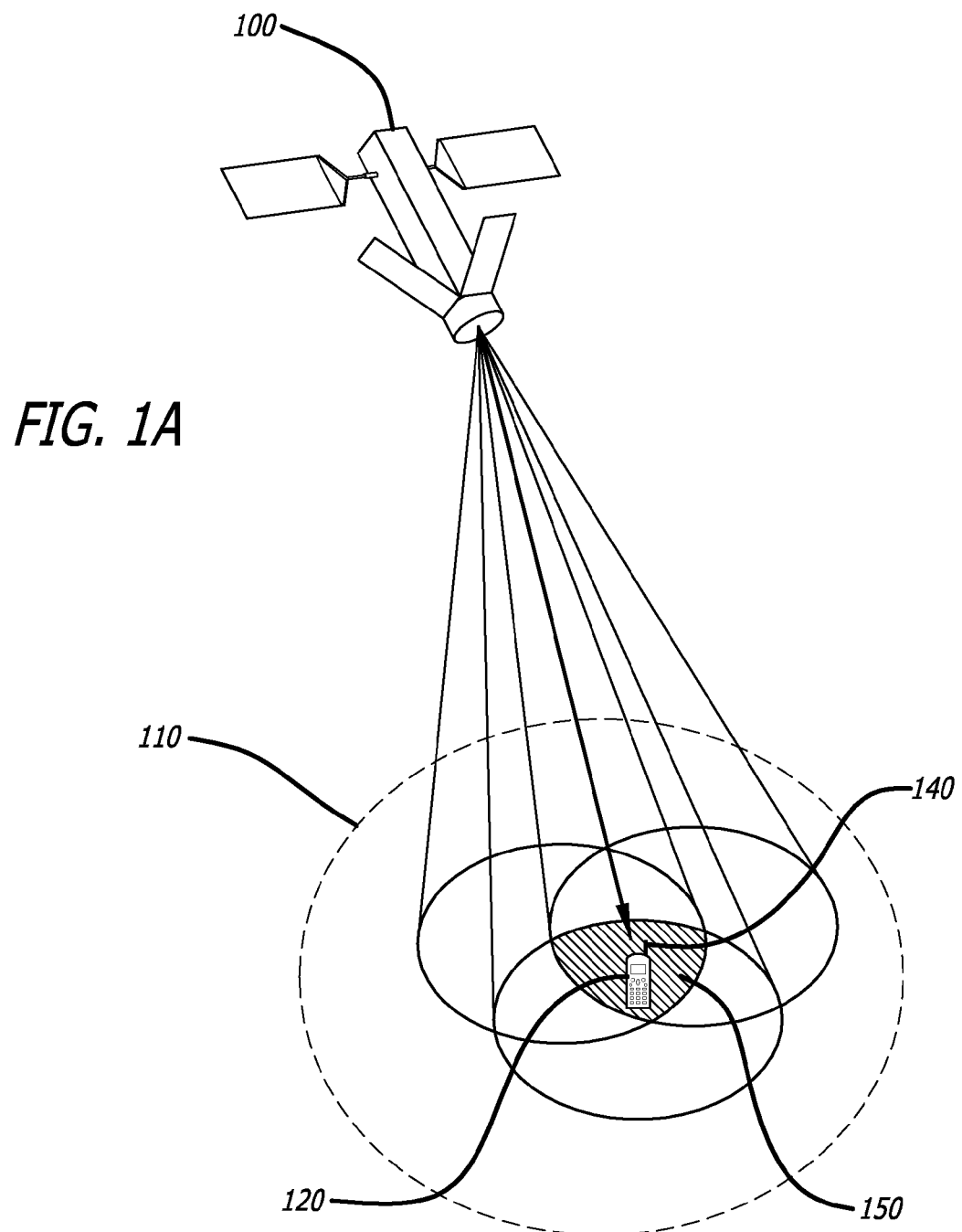
FIG. 1A illustrates the use of a single satellite's overlapping multiple spot beams in order to obtain an estimate of the location of a user receiver device, in accordance with at least one embodiment of the present disclosure.
Figure 1B:
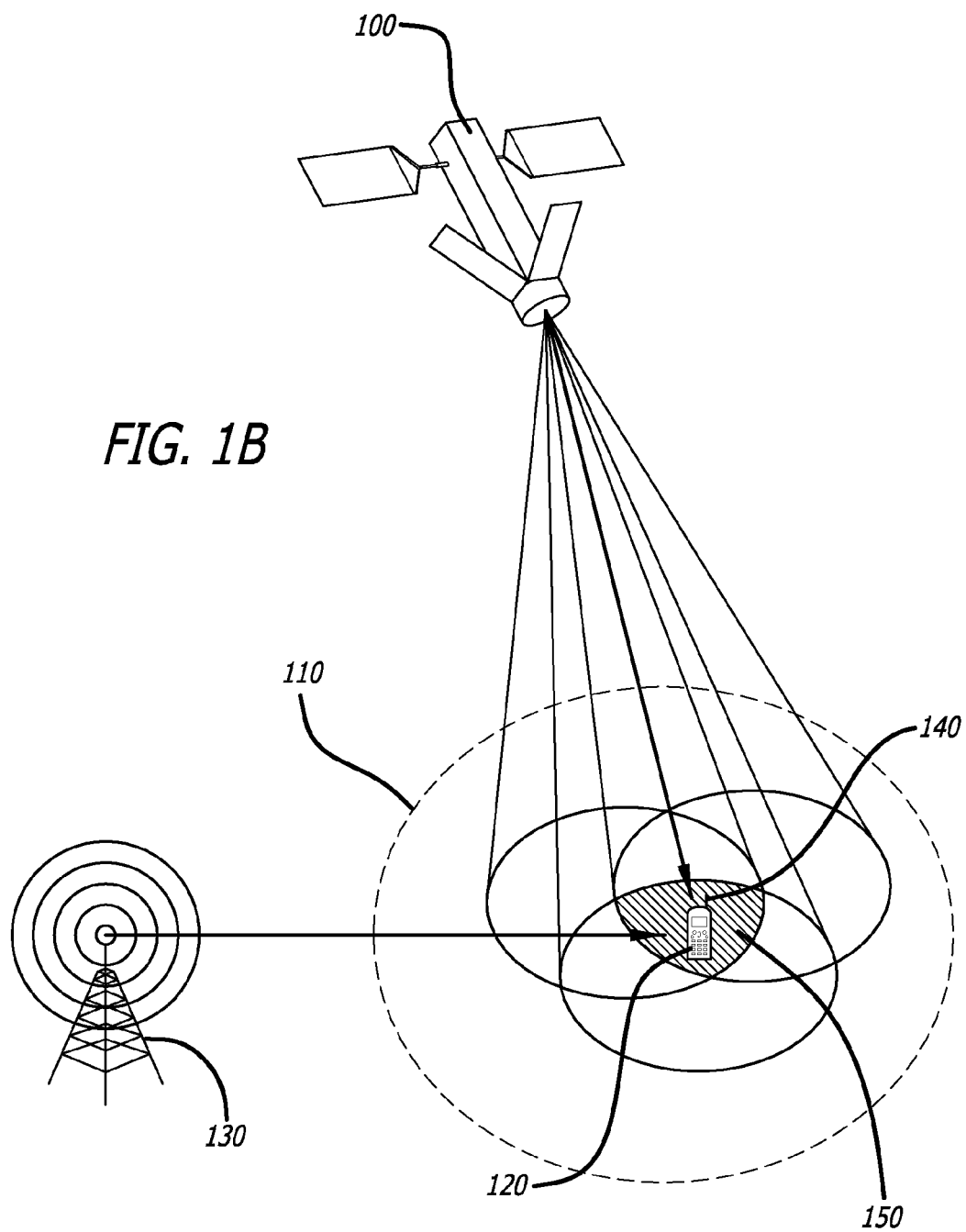
FIG. 1B shows the use of a single satellite's overlapping multiple spot beams along with a cellular network in order to obtain an estimate of the location of a user receiver device, in accordance with at least one embodiment of the present disclosure.

FIG. 1A illustrates the use of a single satellite's 100 overlapping multiple spot beams 110 in order to obtain an estimate of the location of a user receiver device 120, in accordance with at least one embodiment of the present disclosure. And, FIG. 1B shows the use of a single satellite's 100 overlapping multiple spot beams 110 along with the use of a cellular network 130 in order to obtain an estimate of the location of a user receiver device 120, in accordance with at least one embodiment of the present disclosure. FIG. 1B is similar to FIG. 1A except for the fact that FIG. 1B employs the use of a cellular network 130. In both of these figures, it can be seen that the single satellite 100 emits at least one spot beam 110 on Earth. In one or more embodiments, the satellite 100 uses at least one radio frequency (RF) antenna to emit at least one of the spot beams 110. The user receiver device 120 receives a signal from at least one of the projected spot beams 110. The user receiver device 120 then calculates an estimate of its location on Earth according to its location within one of the projected spot beams 110.

In FIGS. 1A and 1B, the user receiver device 120 calculates the location of at least one spot beam within which the user receiver device 120 is located. In order to make this calculation, the user receiver device 120 uses knowledge of the satellite 100 position, knowledge of the satellite 100 attitude, and/or knowledge of the direction and/or pattern of the spot beams 110. In some embodiments, in order for the user receiver device 120 to obtain knowledge of the direction and/or pattern of the spot beams 110, the user receiver device 120 refers to a beam geometry database and/or an internal orbital model.

In FIG. 1A, the satellite 100 position information (i.e. the ephemerides) is transmitted to the user receiver device 120 from the satellite 100 itself. In some embodiments, the user receiver device 120 receives orbital data information and/or orbital delta correction information via transmissions from the satellite 100. In one or more embodiments, the user receiver device 120 calculates the satellite 100 position by using data from its internal orbital model and using orbital delta corrections that it receives from the satellite 100. In some embodiments, the calculation of the direction and/or pattern of the spot beams 110 is accomplished on-board the satellite 100. The direction and/or pattern information of the spot beams 110 may be transmitted from the satellite 100 to the user receiver device 120 as part of a message contained in the signal of the spot beams.

Alternatively, in FIG. 1B, the satellite 100 position information (i.e. the ephemerides) is transmitted to the user receiver device 120 over a cellular network 130. In other embodiments, various types of earth-based networks, other than cellular networks, may be employed by the system of the present disclosure to transmit the satellite 100 position information (i.e. the ephemerides) to the user receiver device 120. In some embodiments, the user receiver device 120 receives orbital data information and/or orbital delta correction information via transmissions from the cellular network 130. In one or more embodiments, the user receiver device 120 calculates the satellite 100 position by using data from its internal orbital model and using orbital delta corrections that it receives from the cellular network 130.

In one or more embodiments, when the user receiver device 120 receives a signal from only one spot beam 110, the user receiver device 120 calculates the estimate of the location of the user receiver device 120 to be located at the center of the spot beam. Alternatively, when the user receiver device 120 receives a signal from two or more spot beams 110, the user receiver device 120 calculates the estimate of the location of the user receiver device 120 to be located at the center of the intersection 150 of the spot beams 110 from which it receives a signal. In other embodiments, when the user receiver device 120 receives a signal from two or more spot beams 110, the user receiver device 120 calculates the estimate of the location of the user receiver device 120 to be located at the centroid of the centers of the spot beams 110 from which it receives a signal. In at least one embodiment, the user receiver device 120 uses signal to noise (SNR) measurements that it receives from the satellite 100 in order to further refine its calculated estimate of its location. It should be noted that in some embodiments, the estimate of the location of the user receiver device 120 is used to provide an improvement in the accuracy of currently used geolocation algorithms. In addition, the estimate of the location of the user receiver device 120 may be used by a global positioning system (GPS) in order to assist in rapidly acquiring the GPS signal.

In some embodiments, the user receiver device 120 of FIGS. 1A and 1B includes at least one radio frequency (RF) antenna 140 that is used to receive a signal from at least one spot beam that is projected from the satellite 100. The RF antenna may be manufactured to be either internal or external to the housing of the user receiver device 120. In some embodiments, the user receiver device 120 also includes a processor that is used to calculate the estimate of the location of the user receiver device 120 according to the user receiver device's 120 location within at least one spot beam 110. In at least one embodiment, the user receiver device 120 further includes a local clock and a memory that is adapted to store successive spot beam identifying information that is recorded over time. In one or more embodiments, the user receiver device 120 is either mobile or stationary.

Figure 2:
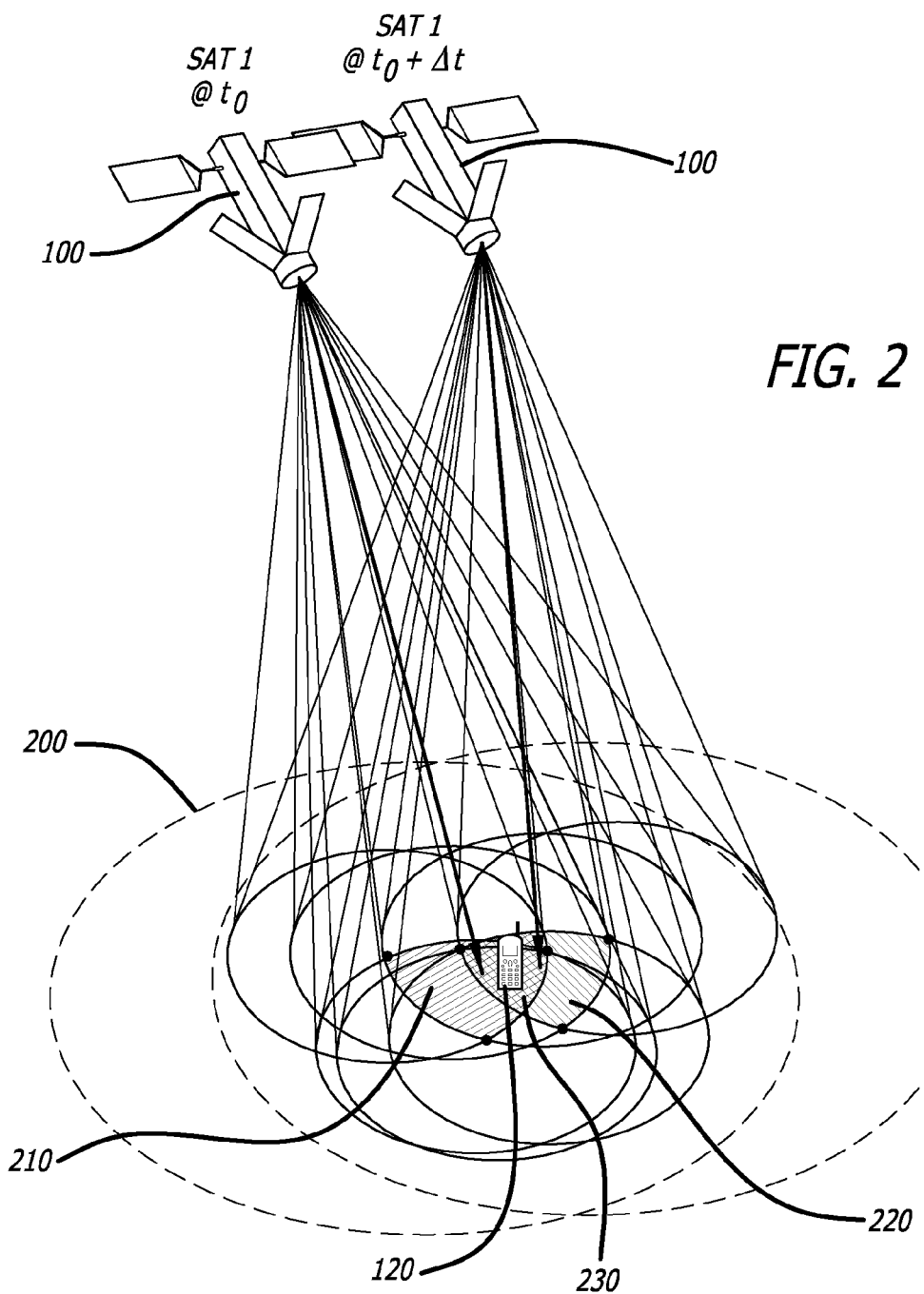
FIG. 2 depicts the use of a single satellite's overlapping multiple spot beams over time in order to obtain an estimate of the location of a user receiver device, in accordance with at least one embodiment of the present disclosure.

FIG. 2 depicts the use of a single satellite's 100 overlapping multiple spot beams over time in order to obtain an estimate of the location of a user receiver device 120, in accordance with at least one embodiment of the present disclosure. In this figure, it is shown that at time $t_0$, the user receiver device 120 is located within an intersection 210 of the spot beams 200 that are radiated by the SAT 1 satellite 100. It should be noted that in this figure the spot beams 200 that are being radiated by SAT 1 satellite 100 are fixed directional beams, not scanning beams. In one or more embodiments, the processor of the user receiver device 120 calculates a first estimate of the location of the user receiver device 120 to be located at the center of the intersection 210 of the spot beams 200. Then, the user receiver device 120 stores the locations of the spot beams 200 at time $t_0$ as well as stores this first estimate of the location of the user receiver device 120 in its memory.

As also shown in this figure, at a later time $t_0+\Delta t$, the spot beams 200 radiated from SAT 1 satellite 100 have swept across the surface of the Earth. As such, the user receiver device 120 is now located within a different intersection 220 of the spot beams 200 on the surface of the Earth. At this point in time, the processor of the user receiver device 120 calculates a second estimate of the location of the user receiver device 120 to be located at the center of the intersection 220 of the spot beams 200. The user receiver device 120 then stores the locations of the spot beams 200 at time $t_0+\Delta t$ as well as stores the second estimate of the location of the user receiver device 120 in its memory.

Once the user receiver device 120 obtains at least two estimates of the locations of the user receiver device 120, the processor of the user receiver device 120 uses the estimates to calculate a further-refined estimate of the location of the user receiver device 120. In this figure, it is shown that the processor of the user receiver device 120 calculated the refined estimate of the location of the user receiver device 120 to be in the center of the overlapping area 230 of the intersection 210 area and the intersection 220 area.

In one or more embodiments, the user receiver device 120 uses a beam averaging technique in order to obtain the further refined estimate. With this technique, the processor of the user receiver device 120 calculates the average of all of the stored estimates of the location of the user receiver device 120 in order to obtain a refined estimate. In some embodiments, the processor of the user receiver device 120 uses a Kalman filter in order to perform the beam averaging. In alternative embodiments, the processor of the user receiver device 120 uses a matched filter in order to perform the beam averaging.

Figure 3:
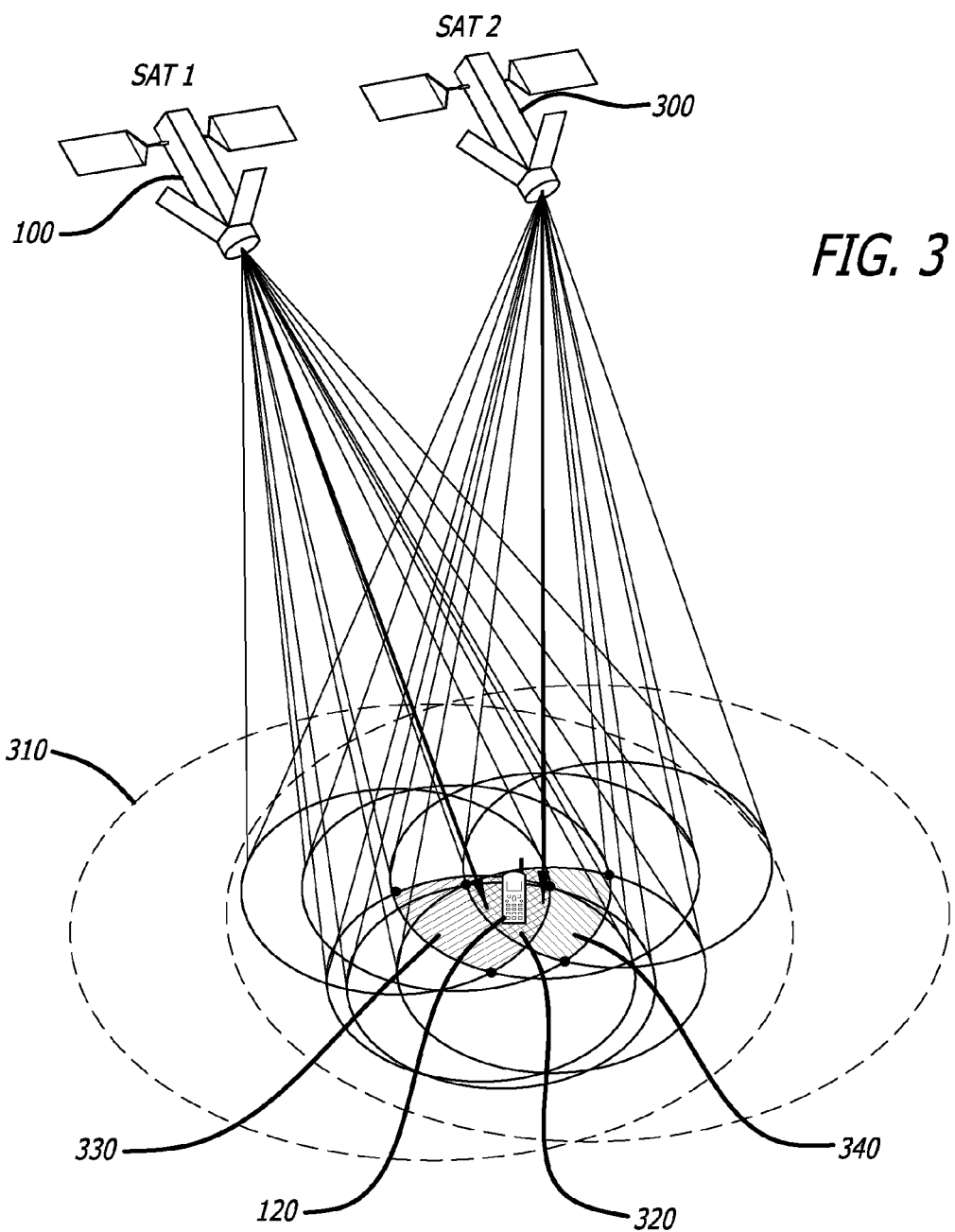
FIG. 3 illustrates the use of two satellites' overlapping multiple spot beams in order to obtain an estimate of the location of a user receiver device, in accordance with at least one embodiment of the present disclosure.

FIG. 3 illustrates the use of two satellites' overlapping multiple spot beams in order to obtain an estimate of the location of a user receiver device, in accordance with at least one embodiment of the present disclosure. In this figure, it is shown that at time $t_0$, the user receiver device 120 is located within an intersection 320 of the spot beams 310 that are radiated by the SAT 1 satellite 100 and the SAT 2 satellite 300. In this figure, the spot beams 310 that are being radiated by the SAT 1 satellite 100 and the SAT 2 satellite 300 are not scanning beams, but rather are fixed directional beams. In some embodiments, the processor of the user receiver device 120 calculates a first estimate of the location of the user receiver device 120 to be located at the center of the intersection 320 of the intersection 330 of the spot beams that are radiated by the SAT 1 satellite 100 and the intersection 340 of the spot beams that are radiated by the SAT 2 satellite 300. The user receiver device 120 then stores the locations of the spot beams 310 at time $t_0$ as well as stores this first estimate of the location of the user receiver device 120 in its memory.

In at least one embodiment, at time $t_0+\Delta t$, the spot beams 310 radiated from the SAT 1 satellite 100 and the SAT 2 satellite 300 have swept across the surface of the Earth. As such, the user receiver device 120 is now located within a different intersection of the intersection of the spot beams that are radiated by the SAT 1 satellite 100 and the intersection of the spot beams that are radiated by the SAT 2 satellite 300. At this point in time, the processor of the user receiver device 120 calculates a second estimate of the location of the user receiver device 120 to be located at the intersection of the intersection of the spot beams that are radiated by the SAT 1 satellite 100 and the intersection of the spot beams that are radiated by the SAT 2 satellite 300.

The user receiver device 120 then stores the locations of the spot beams 310 at time $t_0+\Delta t$ and stores the second estimate of the location of the user receiver device 120 in its memory. In some embodiments, the user receiver device 120 obtains a more refined estimate by using beam averaging. For the beam averaging, the processor of the user receiver device 120 determines the refined estimate by calculating the average of all of the stored estimates of the location of the user receiver device 120.

It should be noted that in alternative embodiments, the processor of the user receiver device 120 calculates the location of the user receiver device 120 to be located at the centroid of the centers of the spot beams that are radiated by the SAT 1 satellite 100 and the centers of the spot beams that are radiated by the SAT 2 satellite 300.

Figure 4:
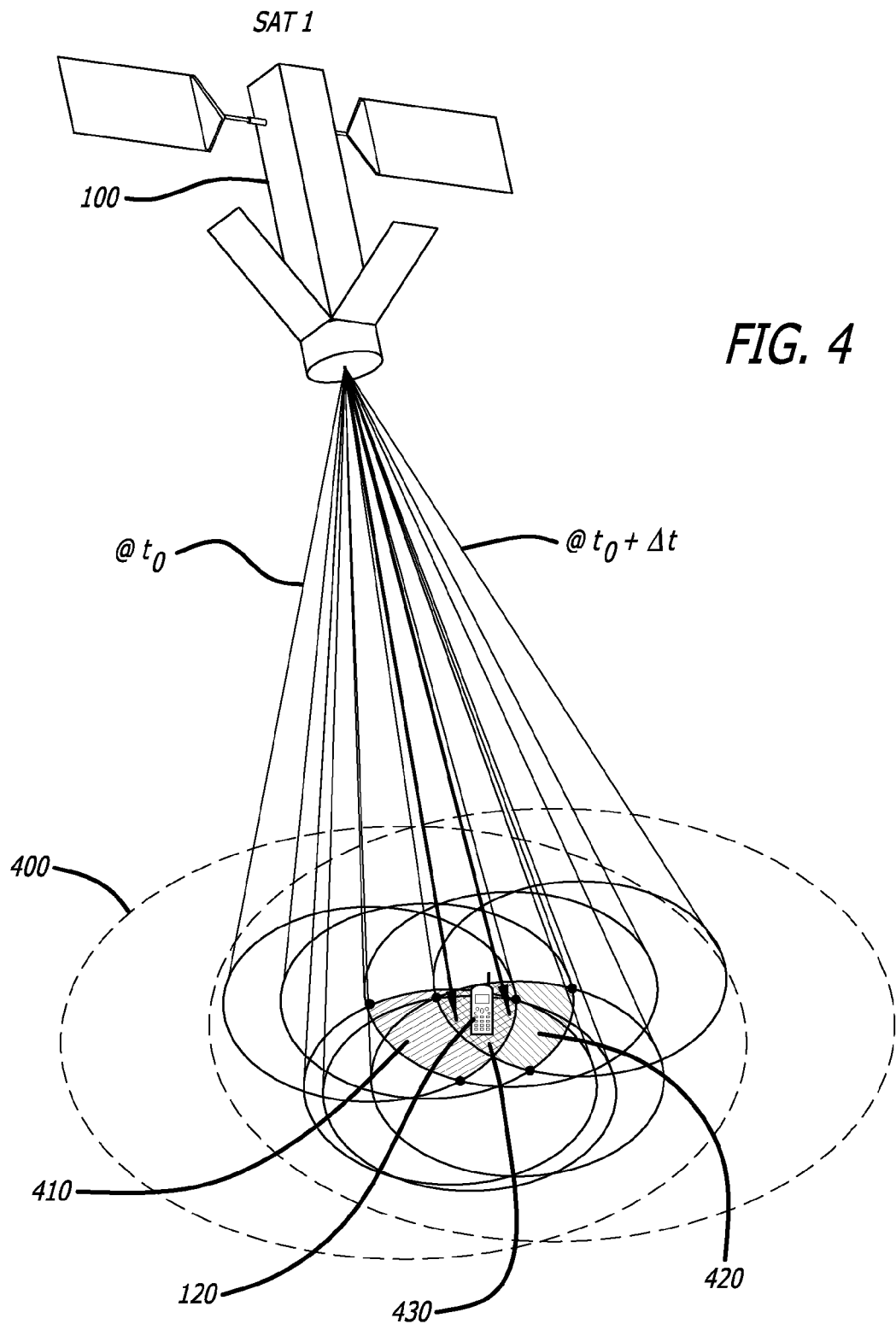
FIG. 4 shows the use of a single satellite's overlapping multiple spot beams that are scanned over time in order to obtain an estimate of the location of a user receiver device, in accordance with at least one embodiment of the present disclosure.

FIG. 4 shows the use of a single satellite's overlapping multiple spot beams that are scanned over time in order to obtain an estimate of the location of a user receiver device, in accordance with at least one embodiment of the present disclosure. In this figure, it is shown that at time $t_0$, the user receiver device 120 is located within an intersection 410 of the spot beams 400 that are radiated by the SAT 1 satellite 100. It should be noted that the spot beams 400 radiated by the SAT 1 satellite 100 are scanning beams, not fixed directional beams. As such, the scanning spot beams 400 are being swept across the surface of the Earth over time. The processor of the user receiver device 120 calculates a first estimate of the location of the user receiver device 120 to be located at the center of the intersection 410 of the spot beams 400 that are radiated by the SAT 1 satellite 100. Then, the user receiver device 120 stores the locations of the spot beams 400 at time $t_0$ as well as stores this first estimate of the location of the user receiver device 120 in its memory.

At time $t_0+\Delta t$, the scanning spot beams 400 radiated from the SAT 1 satellite 100 have swept across the surface of the Earth. The user receiver device 120 is now located within a different intersection 420 of the spot beams 400 on the surface of the Earth. At this time, the processor of the user receiver device 120 calculates a second estimate of the location of the user receiver device 120 to be located at the center of the intersection 420 of the spot beams 400. Then, the user receiver device 120 stores the locations of the spot beams 400 at time $t_0+\Delta t$ and stores the second estimate of the location of the user receiver device 120 in its memory.

After the user receiver device 120 obtains at least two estimates of the location of the user receiver device 120, the processor of the user receiver device 120 uses the estimates to calculate a refined estimate of the location of the user receiver device 120. The processor of the user receiver device 120 calculates the refined estimate of the location of the user receiver device 120 to be in the center of the overlapping area 430 of the intersection 410 area and the intersection 420 area.

In some embodiments, the user receiver device 120 uses beam averaging in order to calculate the further refined estimate. For this technique, the processor of the user receiver device 120 calculates the average of all of the stored estimates of the location of the user receiver device 120 in order to obtain the refined estimate.

Figure 5:
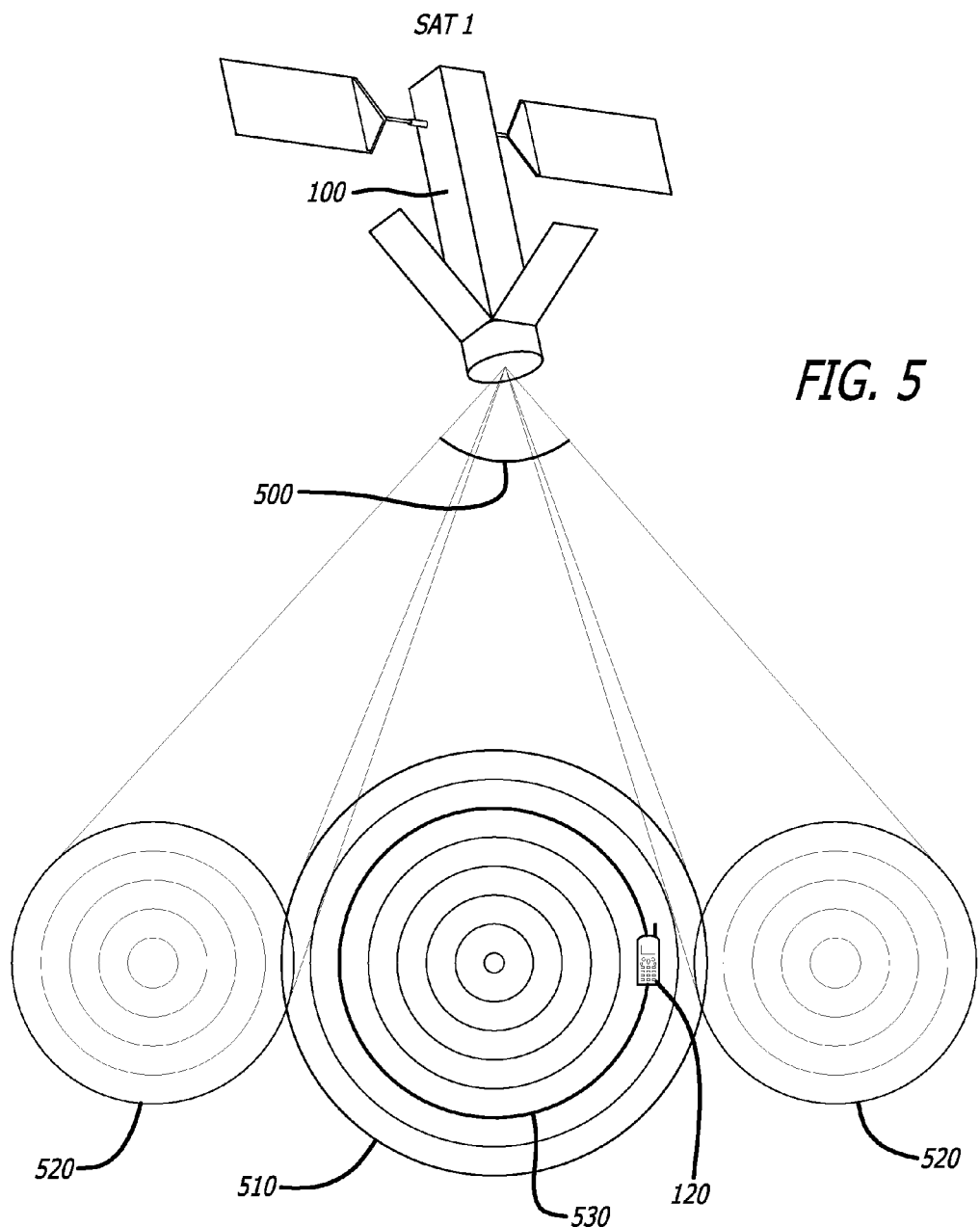
FIG. 5 depicts the use of a single satellite's signal amplitude that is received by the user receiver device in order to obtain an estimate of the location of a user receiver device, in accordance with at least one embodiment of the present disclosure.
Figure 6:
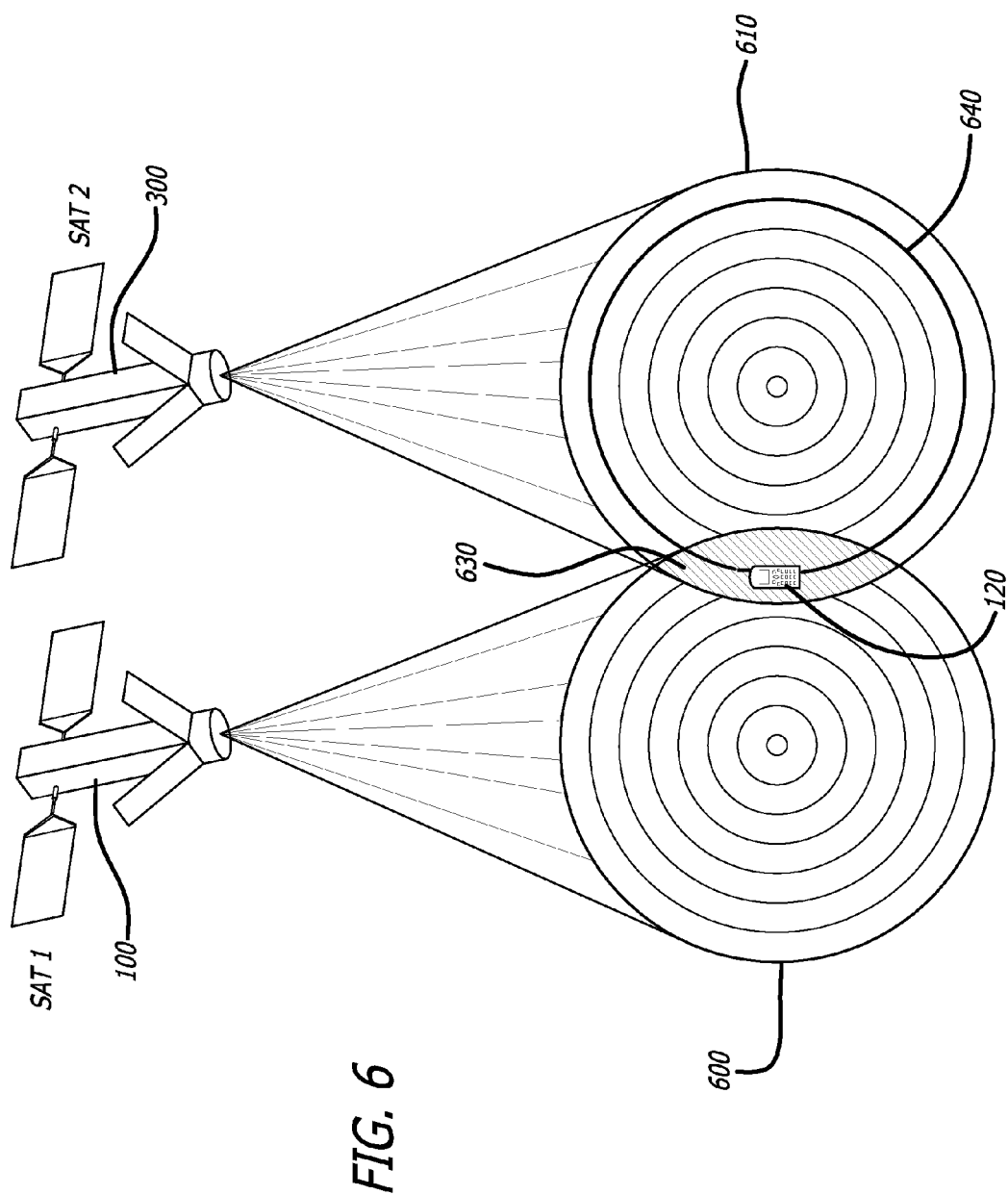
FIG. 6 shows the use of two satellites' signal amplitudes that are received by the user receiver device in order to obtain an estimate of the location of a user receiver device, in accordance with at least one embodiment of the present disclosure.
Figure 7:
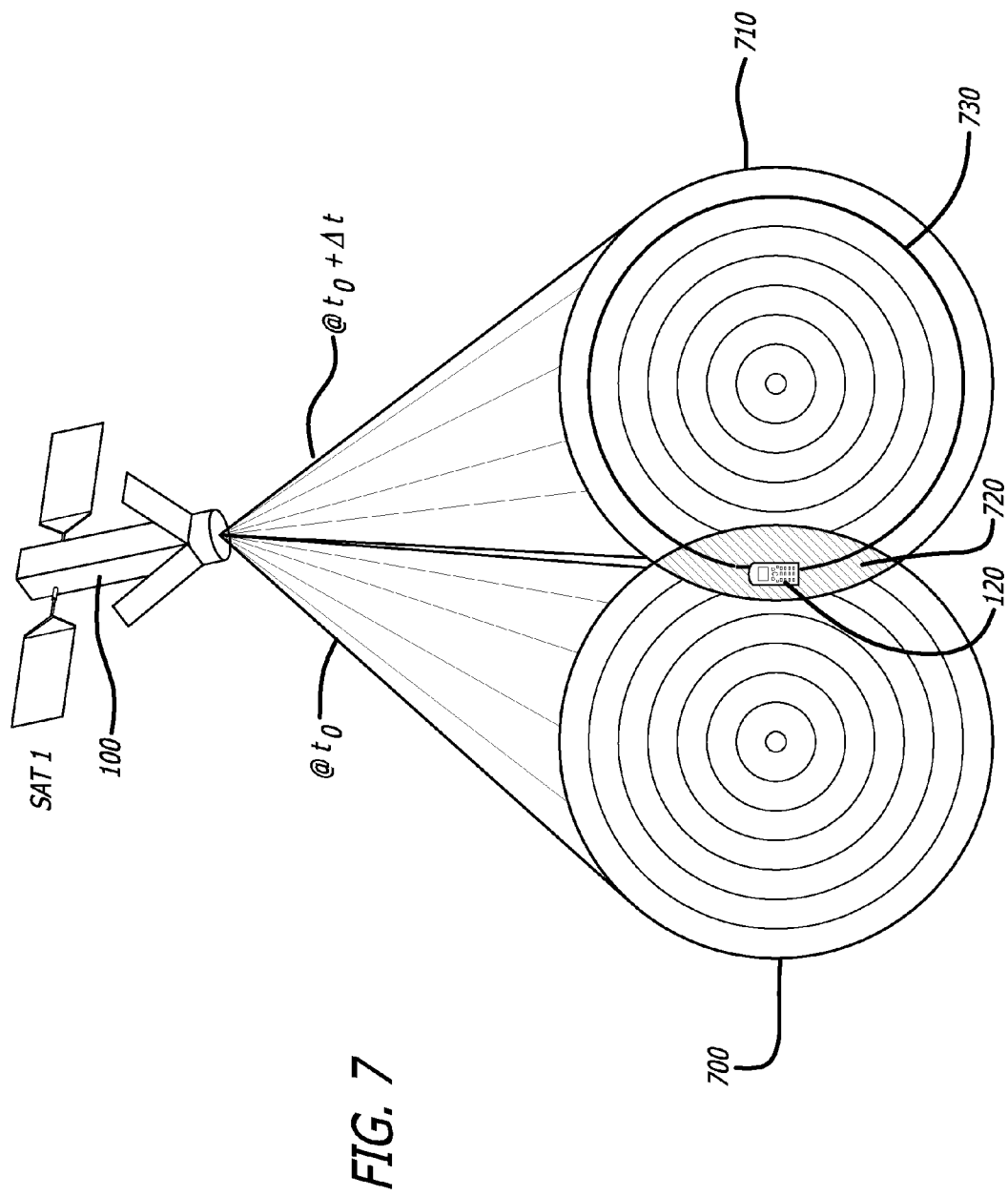
FIG. 7 illustrates the use of a single satellite's signal amplitude from a spot beam that is scanned over time in order to obtain an estimate of the location of a user receiver device, in accordance with at least one embodiment of the present disclosure.

FIGS. 5, 6, and 7 show various embodiments of the use of satellite signal amplitude in order to obtain an estimate of the location of a user receiver device, in accordance with multiple embodiments of the present disclosure. In particular, FIG. 5 depicts the use of a single satellite's signal amplitude that is received by the user receiver device in order to obtain an estimate of the location of a user receiver device, FIG. 6 shows the use of two satellites' signal amplitudes that are received by the user receiver device in order to obtain an estimate of the location of a user receiver device, and FIG. 7 illustrates the use of a single satellite's signal amplitude from a spot beam that is scanned over time in order to obtain an estimate of the location of a user receiver device.

In FIG. 5, the SAT 1 satellite 100 radiates one spot beam 110 on Earth. In this figure, the spot beam 500 is shown to have a main beam 510 and two side lobe beams 520. It should be noted that, for this figure, the spot beam 500 is a fixed directional beam, not a scanning beam. In this figure, the user receiver device 120 is shown to receive a signal from the radiated main beam 510. The processor of the user receiver device 120 uses the amplitude of the signal that it receives to calculate an estimate of its location on Earth according to its location within the signal amplitude contours 530 of the projected main beam 510. Once the user receiver device 120 obtains an estimate of its location, the user receiver device 120 stores the location of the spot beam 500 on Earth as well as stores its estimate of the location of the user receiver device 120 in its memory.

In FIG. 6, the SAT 1 satellite 100 and the SAT 2 satellite 300 are each shown to each be radiating one spot beam 600, 610, respectively, on Earth. In this figure, it is shown that the user receiver device 120 is located within an intersection 630 of the spot beam 600 that is radiated by the SAT 1 satellite 100 and the spot beam 610 that is radiated by the SAT 2 satellite 300. For this figure, spot beam 600 and spot beam 610 are a fixed directional beams, not a scanning beams. The processor of the user receiver device 120 uses the amplitude of the signal that it receives to calculate an estimate of its location within intersection 630 according to its location within the signal amplitude contours 640 of the projected spot beams 600, 610. After the user receiver device 120 obtains an estimate of its location, the user receiver device 120 stores the locations of the spot beam 600 and spot beam 610 as well as stores its estimate of the location of the user receiver device 120 in its memory.

In FIG. 7, at time $t_0$, the SAT 1 satellite 100 is shown to radiate a spot beam 700 on Earth. At this time, the user receiver device 120 is located within spot beam 700 that is being radiated by the SAT 1 satellite 100. It should be noted that the spot beam 700 radiated by the SAT 1 satellite 100 is a scanning beam, not a fixed directional beam. Thus, as spot beam 700 is being scanned over time, it is being swept across the surface of the Earth. The processor of the user receiver device 120 uses the amplitude of the signal that it receives to calculate a first estimate of its location within spot beam 700 according to its location within the signal amplitude contours of spot beam 700. The user receiver device 120 then stores the location of the spot beam 700 at time $t_0$ as well as stores the first estimate of the location of the user receiver device 120 in its memory.

Also in FIG. 7, at time $t_0+\Delta t$, the spot beam 700 radiated from the SAT 1 satellite 100 is shown to have swept across the surface of the Earth (now shown as spot beam 710). The user receiver device 120 is now located within spot beam 710. At this time, the processor of the user receiver device 120 uses the amplitude of the signal that it receives to calculate a second estimate of its location within spot beam 710 according to its location within the signal amplitude contours of spot beam 710. Then, the user receiver device 120 stores the location of the spot beam 710 at time $t_0+\Delta t$ and stores the second estimate of the location of the user receiver device 120 in its memory.

Once the user receiver device 120 obtains at least two estimates of the location of the user receiver device 120, the processor of the user receiver device 120 uses the estimates to calculate a further refined estimate of the location of the user receiver device 120. The processor of the user receiver device 120 uses beam averaging to calculate the further refined estimate of the location of the user receiver device 120 to be within the overlapping area 720 of spot beam 700 and spot beam 710. In addition, the processor obtains an even further refined estimate of the location of the user receiver device 120 by using the amplitude of the signal that it receives to calculate its location within the overlapping area 720 according to its location within the signal amplitude contours 730 of spot beams 700 and 710.

Figure 8:
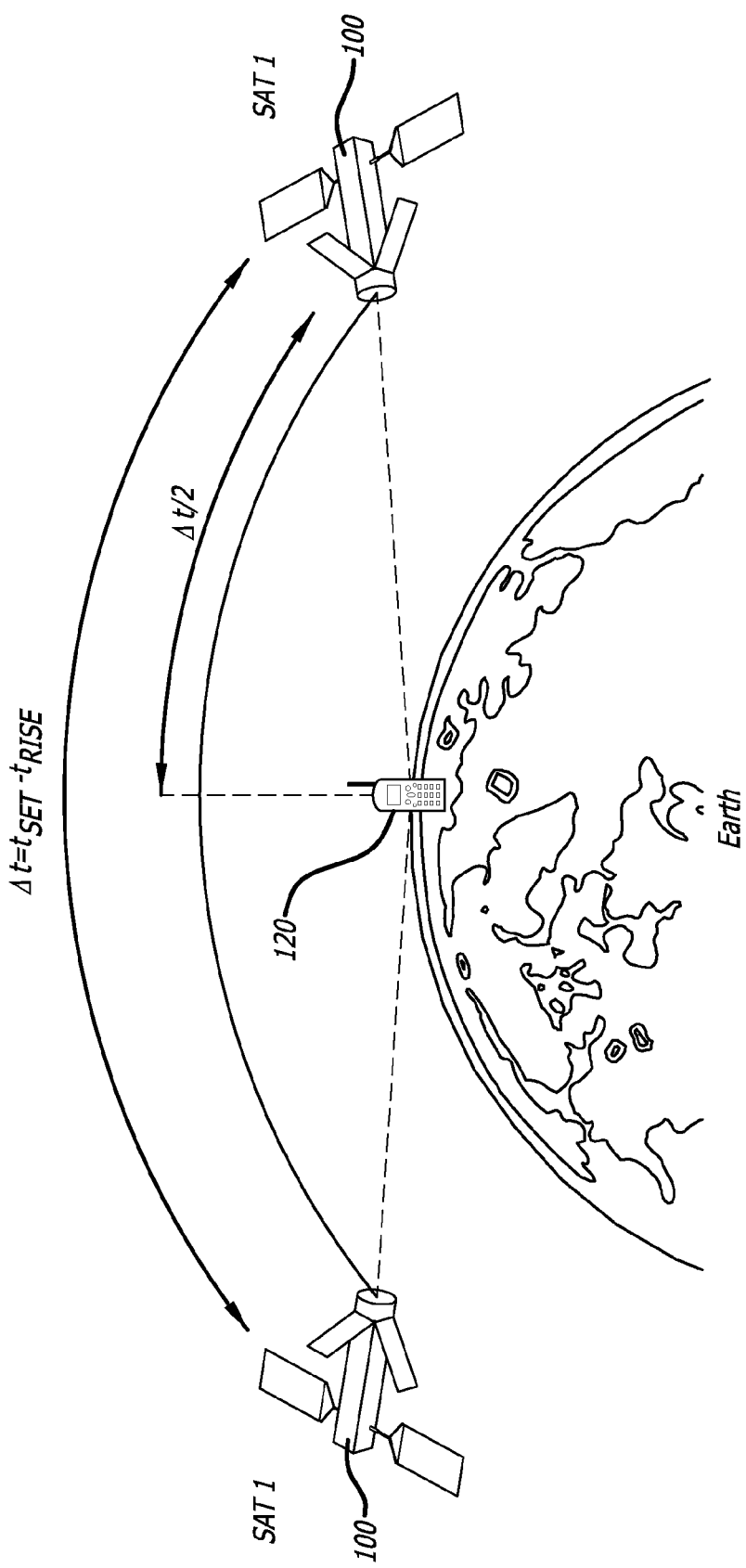
FIG. 8 is a pictorial representation of using a single satellite's spot-beam's rising- and setting-times to estimate the location of a user receiver device for a uniform masking angle, in accordance with at least one embodiment of the present disclosure.

FIG. 8 is a pictorial representation of using a single satellite's 100 spot beam's rising and setting times to estimate the location of a user receiver device 120 for a uniform masking angle, in accordance with at least one embodiment of the present disclosure. In this figure, a spot beam's rising and setting times are used to obtain an estimate of the user receiver device's 120 location. For these embodiments, all of the spot beam's positions are recorded from the time the spot beam rises ($t_{RISE}$) to the time the spot beam sets ($t_{SET}$). Assuming uniform elevation mask angles in all directions with respect to the user receiver device 120, at time=$((t_{SET}-t_{RISE})/2)$, the user receiver device is assumed to be located at the center of the spot beam in the in-track direction.

It should be noted that the in-track direction is defined as the direction of motion of the satellite passing overhead the user receiver device 120. For the in-track direction coordinate frame, the origin is located at the location of the user receiver device 120, the x-axis is in the direction of motion of the satellite passing overhead the user receiver device 120, the z-axis is in the direction towards the center of the Earth, and the y-axis completes the right-handed Cartesian coordinate frame.

FIG. 9A shows an illustration of using a single spot beam's rising and setting times to estimate the location of a user receiver device for a non-uniform masking angle, in accordance with at least one embodiment of the present disclosure. And, FIG. 9B shows a pictorial representation of using a single satellite's spot beam's rising and setting times to estimate the location of a user receiver device for a non-uniform masking angle, in accordance with at least one embodiment of the present disclosure. For these figures, since the beam pattern for the satellite constellation that passes over the user receiver device is in a known direction (e.g., North to South), only the masking angles in those directions (e.g., North and South) would be pertinent because the first direction (e.g., North) is the direction in which the satellite rises and the second direction (e.g., South) is the direction in which the satellite sets.

For these embodiments, $\alpha$ represents the constellation masking angle; $\beta_1$ is the masking angle that is associated with a possible obstruction that is blocking the user receiver device's line of sight to the satellite in the direction in which the satellite rises; and $\beta_2$ is the masking angle that is associated with a possible obstruction that is blocking the user receiver device's line of sight to the satellite in the direction in which the satellite sets. Bias is introduced when either or both $\beta$ angle(s)>$\alpha$. The uniform mask angle case as discussed in FIG. 8 occurs when $\beta_1=\beta_2=\alpha$ or $\beta_1=\beta_2\neq\alpha$. For these embodiments, the $\beta$ angles either are known or are estimated. FIGS. 9A and 9B show a specific case where there is an obstruction causing $\beta_2$ to be greater than the masking angle, $\alpha$. When there is a small obstruction in the satellite's rise direction, $\beta_1<\alpha$ and, thus, the obstruction does not affect the user receiver device's line of sight with the satellite. Therefore, the obstruction is negligible. It should be noted that similar variations exist for an obstruction in the satellite's rising direction where $\beta_1>\alpha$. Assuming a non-uniform elevation in the direction in which the satellite rises and in the direction in which the satellite sets, it may be assumed that at time $(\Delta t_{true})/2$, where $(\Delta t_{True})/2=(\Delta_{RcverMeasured}+\Delta t_{\beta2Bias})/2$, the user receiver device is located at the center of the spot beam projection in the in-track direction.

FIG. 10 provides a flow diagram 1000 illustrating a method of obtaining a running estimate of the range between a user receiver device and a satellite, in accordance with at least one embodiment of the present disclosure. In this figure, a user receiver device receives the satellite ephemerides data from a low-earth orbit (LEO) satellite 1010. It should be noted that in other various embodiments, different types of satellites other than LEO satellites may be employed by the disclosed method.

After the user receiver device receives the ephemerides data, the processor of the user receiver device derives the instantaneous satellite position, velocity, and acceleration 1020. After the user receiver device calculates those derivations, the user receiver device receives from the satellite initial spot beamidentifiers of the radiated satellite spot beam 1030. After receiving spot beamidentifiers from the satellite, the user receiver device logs in the user receiver device's memory the spot beamidentifiers and spot beam centers for successive spot beams 1040.

Then, the processor of the user receiver device employs those logged spot beamidentifiers and spot beam centers with a beam averaging technique in order to derive a running user receiver device position estimate 1050. The processor of the user receiver device then derives a running estimate of the user receiver device to satellite unit vector 1060. Next, the processor of the user receiver device measures the Doppler frequency offset of the satellite 1070. Then, the processor of the user receiver device uses the Doppler frequency offset to calculate a Doppler range estimate 1080. In at least one embodiment, the user receiver device uses a Kalman filter to calculate the Doppler range estimate. The user receiver device maintains a running estimate of the calculated user receiver device to satellite range 1090.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method of providing an estimate of a location of a user receiver device, the method comprising:
    emitting, from at least one vehicle with at least one of a known orbit or a known path, at least one spot beam on Earth;
    receiving, with the user receiver device, a signal from the at least one spot beam as the at least one spot beam sweeps over the user receiver device as time progresses to obtain an amplitude of the signal from the at least one spot beam; and
    calculating, with the user receiver device, the estimate of the location of the user receiver device by using: a known position of the at least one vehicle, a known direction and pattern of the at least one spot beam, and multiple amplitudes of the signal measured over time from within the at least one spot beam, as the at least one spot beam sweeps over the user receiver device over time.

2. The method of providing an estimate of a location of a user receiver device of claim 1, wherein the method further comprises calculating a range from the at least one vehicle to a surface of the Earth.

3. The method of providing an estimate of a location of a user receiver device of claim 1, wherein the method further comprises calculating a range from the at least one vehicle to the user receiver device.

4. The method of providing an estimate of a location of a user receiver device of claim 3, wherein the calculating of the range from the at least one vehicle to the user receiver device comprises:
    measuring a Doppler frequency offset of the at least one vehicle;
    calculating a Doppler range estimate and pseudorange measurements using a Kalman filter; and
    calculating a running estimate of the range from the at least one vehicle to the user receiver device.

5. The method of providing an estimate of a location of a user receiver device of claim 1, wherein the user receiver device is located within a jammed environment.

6. The method of providing an estimate of a location of a user receiver device of claim 1, wherein the user receiver device is located within an occluded environment.

7. The method of providing an estimate of a location of a user receiver device of claim 6, wherein the occluded environment is indoors.

8. The method of providing an estimate of a location of a user receiver device of claim 1, wherein the method further comprises using signal to noise (SNR) measurements from the at least one vehicle in order to further refine the estimate of the location of the user receiver device.

9. The method of providing an estimate of a location of a user receiver device of claim 1, wherein the at least one vehicle is a satellite.

10. The method of providing an estimate of a location of a user receiver device of claim 1, wherein the at least one vehicle is a pseudolite.

11. The method of providing an estimate of a location of a user receiver device of claim 1, wherein the at least one vehicle is a space shuttle.

12. The method of providing an estimate of a location of a user receiver device of claim 1, wherein the at least one vehicle is an aircraft.

13. The method of providing an estimate of a location of a user receiver device of claim 12, wherein the aircraft is an airplane.

14. The method of providing an estimate of a location of a user receiver device of claim 12, wherein the aircraft is an unmanned aerial vehicle (UAV).

15. The method of providing an estimate of a location of a user receiver device of claim 1, wherein the at least one vehicle is a balloon.

16. The method of providing an estimate of a location of a user receiver device of claim 1, wherein the at least one vehicle is a helicopter.

17. The method of providing an estimate of a location of a user receiver device of claim 9, wherein the satellite is a low earth orbit (LEO) satellite.

18. The method of providing an estimate of a location of a user receiver device of claim 9, wherein the satellite is a medium earth orbit (MEO) satellite.

19. The method of providing an estimate of a location of a user receiver device of claim 9, wherein the satellite is a geostationary earth orbit (GEO) satellite.

20. The method of providing an estimate of a location of a user receiver device of claim 1, wherein the at least one vehicle has a known orbit.

21. The method of providing an estimate of a location of a user receiver device of claim 1, wherein the at least one vehicle has a known path.

22. The method of providing an estimate of a location of a user receiver device of claim 1, wherein the user receiver device is mobile.

23. The method of providing an estimate of a location of a user receiver device of claim 1, wherein the user receiver device is stationary.

24. The method of providing an estimate of a location of a user receiver device of claim 1, wherein the at least one vehicle emits the at least one spot beam with at least one radio frequency (RF) antenna.

25. The method of providing an estimate of a location of a user receiver device of claim 24, wherein the at least one spot beam is radiated from the at least one RF antenna as a fixed position beam.

26. The method of providing an estimate of a location of a user receiver device of claim 24, wherein the at least one spot beam is radiated from the at least one RF antenna as a scanning beam.

27. The method of providing an estimate of a location of a user receiver device of claim 1, wherein the user receiver device receives the signal from the at least one spot beam with at least one radio frequency (RF) antenna.

28. The method of providing an estimate of a location of a user receiver device of claim 1, wherein the user receiver device uses a processor to calculate the estimate of the location of the user receiver device.

29. The method of providing an estimate of a location of a user receiver device of claim 1, wherein when the user receiver device receives a signal from only one spot beam, the user receiver device calculates the estimate of the location of the user receiver device to be located in a center of the one spot beam.

30. The method of providing an estimate of a location of a user receiver device of claim 1, wherein when the user receiver device receives signals from at least two spot beams, the user receiver device calculates the estimate of the location of the user receiver device to be located in a center of an intersection of the at least two spot beams.

31. The method of providing an estimate of a location of a user receiver device of claim 1, wherein when the user receiver device receives signals from at least two spot beams, the user receiver device calculates the estimate of the location of the user receiver device to be located at a centroid of centers of the at least two spot beams.

32. The method of providing an estimate of a location of a user receiver device of claim 1, wherein the method further comprises determining a time the at least one spot beam rises ($t_{RISE}$) to a time the at least one spot beam sets ($t_{SET}$).

33. The method of providing an estimate of a location of a user receiver device of claim 32, wherein the method further comprises determining, when mask angles are uniform in all directions with respect to the user receiver device, that the user receiver device is located at a center of the at least one spot beam in an in-track direction associated with the at least one spot beam at time=$((t_{SET}-t_{RISE})/2)$.

34. The method of providing an estimate of a location of a user receiver device of claim 32, wherein the method further comprises determining, when mask angles are non-uniform in a spot beam rise direction and a spot beam set direction, that the user receiver device is located at a center of the at least one spot beam in an in-track direction associated with the at least one spot beam at time=$((\Delta t_{True})/2)$, where $(\Delta t_{True})/2=(\Delta t_{RcverMeasured}+\Delta_{\beta Bias})/2$.

35. The method of providing an estimate of a location of a user receiver device of claim 1, wherein the user receiver device averages two or more estimates of the location of the user receiver device that were calculated over time in order to further refine the estimate of the location of the user receiver device.

36. The method of providing an estimate of a location of a user receiver device of claim 35, wherein the user receiver device uses a Kalman filter in order to average the two or more estimates of the location of the user receiver device.

37. The method of providing an estimate of a location of a user receiver device of claim 35, wherein the user receiver device uses a matched filter in order to average the two or more estimates of the location of the user receiver device.

38. The method of providing an estimate of a location of a user receiver device of claim 1, wherein the estimate of the location of the user receiver is used by a global positioning system (GPS) in order to assist in rapidly acquiring the GPS signal.

39. A system of providing an estimate of a location of a user receiver device, the system comprising:

at least one vehicle with at least one of a known orbit or a known path, wherein the at least one vehicle emits at least one spot beam on Earth; and the user receiver device, wherein the user receiver device comprises:

at least one radio frequency (RF) antenna, wherein the at least one RF antenna receives a signal from the at least one spot beam as the at least one spot beam sweeps over the user receiver device as time progresses; and a processor, wherein the processor calculates the estimate of the location of the user receiver device by using: a known position of the at least one vehicle, a known direction and pattern of the at least one spot beam, and multiple amplitudes of the signal measured over time from within the at least one spot beam, as the at least one spot beam sweeps over the user receiver device over time.

40. The system of providing an estimate of a location of a user receiver device of claim 39, wherein the user receiver device further comprises:

a local clock; and a memory, wherein the memory is adapted to store successive spot beam identifying information that is recorded over time.

41. The system of providing an estimate of a location of a user receiver device of claim 39, wherein the processor is to measure Doppler frequency offset of the at least one vehicle.

42. The system of providing an estimate of a location of a user receiver device of claim 39, wherein the user receiver device further comprises an internal orbital model.

43. The system of providing an estimate of a location of a user receiver device of claim 42, wherein the user receiver device receives orbital data information via transmissions from the at least one vehicle.

44. The system of providing an estimate of a location of a user receiver device of claim 42, wherein the user receiver device receives orbital delta correction information via transmissions from the at least one vehicle.

45. The system of providing an estimate of a location of a user receiver device of claim 42, wherein the user receiver device receives orbital delta correction information via transmissions from an earth based network.

46. The system of providing an estimate of a location of a user receiver device of claim 45, wherein the earth based network is a cellular network.

* * * * *